(12) United States Patent
Larsson et al.

(10) Patent No.: US 6,172,963 B1
(45) Date of Patent: Jan. 9, 2001

(54) FLOW CONTROL FOR SWITCHING

(75) Inventors: Berndt Larsson, Lindingö; Magnus Buhrgard, Stockholm; Krzysztof Kaminski, Tullinge, all of (SE)

(73) Assignee: Telefonaktiebolaget LM Ericsson (publ), Stockholm (SE)

( * ) Notice: Under 35 U.S.C. 154(b), the term of this patent shall be extended for 0 days.

(21) Appl. No.: 09/023,164

(22) Filed: Feb. 13, 1998

(30) Foreign Application Priority Data

Feb. 19, 1997 (SE) ............................................ 9700586

(51) Int. Cl.[7] ...................................................... H04J 3/00
(52) U.S. Cl. .......................... 370/229; 370/252; 370/395; 370/412
(58) Field of Search ................................. 370/229, 230, 370/231, 232, 233, 234, 235, 236, 252, 253, 395, 412, 413, 414, 426

(56) References Cited

U.S. PATENT DOCUMENTS

| 5,407,849 | 4/1995 | Khambaty et al. ................ 437/45 |
| 5,412,648 | 5/1995 | Fan ..................................... 370/414 |
| 5,416,356 | 5/1995 | Staudinger et al. ................ 257/531 |
| 5,455,820 | 10/1995 | Yamada ............................... 370/413 |
| 5,493,566 | * 2/1996 | Ljungberg et al. ................ 370/231 |
| 5,867,482 | * 2/1999 | Kobayashi .......................... 370/252 |
| 6,023,471 | * 2/2000 | Haddock et al. .................. 370/426 |

FOREIGN PATENT DOCUMENTS

WO97/04543  2/1997  (WO).

* cited by examiner

*Primary Examiner*—Douglas W. Olms
*Assistant Examiner*—Shick Hom
(74) *Attorney, Agent, or Firm*—Burns, Doane, Swecker & Mathis, L.L.P.

(57) ABSTRACT

A method and a device for, preferably in ATM-traffic and in a switch with input and output buffers and with a so-called "credit based solution" for flow control, using a very short time interval between the requests from the input ports to send cells through the switch core to the output ports and where the degree of fullness of the output buffers is accurately supervised and taken into the calculations together with the number of cells in the input buffers when determined how many cells should be allowed to be sent to each output port during the next time interval. A certain overallocation of cells to each output port is permitted.

23 Claims, 3 Drawing Sheets

| LEGEND | |
|---|---|
| REF. # | DESCRIPTION |
| 2-4 | INPUT PORTS |
| 8 | SWITCH CORE |
| 20 | CONTROL UNIT |
| 5-7 | OUTPUT PORTS |
| 31-33 | BUFFER |
| 41-43 | FIFO MEMORIES |

FLOW CONTROL FOR SWITCHING

TECHNICAL FIELD OF THE INVENTION

The invention relates to a method and a device, in preferably an ATM-switch which manages data communication and telephone traffic, in order to be able to have in readiness a large capacity even with relatively small and inexpensive buffers.

DESCRIPTION OF RELATED ART

In modern telecommunication systems, information is grouped into small data units called "packets" where each such packet comprises a field with a "head" which is used in order to identify the packet and a field containing useful information. A packet can also contain a field with information about where the cell originally came from. The packet is guided normally through the communication system from a source to a destination through switches intended for such packet switching which lead the packets through the data network in accordance with the information in the head of each packet and tables in the switches. Such switches receive a flow of data packets from a number of inputs. The head is read and the packet then is guided through the switch towards one of the many outputs which are present.

An ATM-network (Asynchronous Transfer Mode) transmits data which is divided up and packeted in packets with a fixed size, so-called cells, instead of packets with variable lengths as in traditional packet transmissions. The cells are transmitted with a high speed over e.g. optical fibres and experience fast hardware switching. An ATM-network is flexible and can offer services which require different transmission speeds and the network furthermore effectively makes use of various choices of transmission paths.

ATM-connections where the traffic is sent with a strong "burst-like" character require large buffers which are both expensive and difficult to implement.

The prior art shows two main switch structures. The first has buffers on the output connections. This structure has the best performance but is expensive and difficult to implement since large buffers are required. The reason is that each buffer must have the same capacity as the whole switch, as in the worst case situation it can happen that all the inputs transmit towards the same output simultaneously. As ATM-switches work with a data speed per link of up to 622 megabits per second and a total capacity of 10 Gbps or more, it is extremely difficult to construct output buffers with sufficient bandwidth and memory capacity as is required for certain of the services which should be able to be supported in an ATM-switch.

In the second structure, buffers are placed at the inputs to the switch. The buffers are made from normal FIFO-memories and are usually placed in so-called switch ports. This solution with a buffer for each input means that each buffer only is required to cope with the same cell speed which corresponds to the traffic on the same input. The problem with this model is that a flow control is required as cells would be lost if several inputs sent simultaneously to the same output. Another disadvantage with the same switch structure is the known head-of-the-line (HOL) problem. This occurs when certain FIFO for a period of time are prevented by the control logic from sending cells in turn to a certain output since other inputs simultaneously want to send there. Consequently, in the stopped FIFO all the cells behind the one waiting to be sent are prevented from being sent even if they are to go to a different output which perhaps at that time is not at all loaded with traffic. The HOL-problem thus results in a bad utilization of the switch.

In this technical field a crucial factor for costs and "time to market" is whether the buffers can be made with commercial memory capsules or whether they must be comprised in large specially constructed circuits.

In order to cope with certain of the problems, sometimes ATM-switches with switch ports both in towards and out from the switch core with respective in- and output buffers are used, which can be seen in e.g. U.S. Pat. No. 5,493,566 where a form of STOP-GO solution is used, where the degree of fillness in the output buffers is supervised and when a certain so-called "STOP-level" is reached in the buffers, a STOP-signal is sent to certain input ports with the order to stop sending to that particular output where the buffer is about to become filled. When the output buffer reaches a lower so-called "GO-level", a GO-signal is sent to the input ports concerned to begin to send cells again. This solution requires that each input port has an input buffer which is divided into a FIFO-memory for each output. The size of the output buffers are here i.a. dependent on how many cells an output buffer maximally can receive after a STOP-signal has been sent in a "worst case"-situation.

The above mentioned patent thus shows a system for flow control through an ATM-switch which has both input and output buffers. The degree of fullness in the output buffers are measured and reported to a so-called "access device" for the input buffers. This comprises both input buffers and a choke mechanism in order to be able to stop the cell flow and thereby retain the cells in the input buffers when the degree of fullness in the output buffers exceeds a certain predetermined level. A status message concerning the degree of fullness of the output buffers is compared with an access message which indicates which output buffers are addressed by cells in the input buffers, and only the cells addressed to the overfull output buffers are stopped by the choke mechanism.

Another known method for controlling the flow of cells is to use a so-called "credit-based scheme" where the different inputs make a request for transmission of a certain number of cells during a fixed predetermined time interval. Even here every input buffer is divided into a number of FIFOs, one for each output. A control procedure among all the FIFOs which have made a request shows how much traffic which is destined to each output. The outputs can then decide, based on the result of the control procedure among the FIFO-memories, how many cells each FIFO may be allowed to send.

When the inputs make their request for transmission of a certain number of cells during a certain time interval, they only request transmission of that much which can be sent without risking queue formation at the outputs. In those cases therefore, no output buffers are required. The prior art also shows how in credit-based schemes, output buffers are used which store cells when there are long predetermined time intervals between the requests. According to the prior art there are in this case two trends. One way where the cells are allowed to be transmitted directly through the switch core as soon as they receive permission. This requires large and expensive output buffers since the number of cells transmitted during the long time interval can vary greatly, especially with the use of ATM-cells which often have a strongly burstlike traffic distribution.

Another way is to produce so-called "shaping" which means that during the time interval it is attempted to spread out the sending of the cells. If, for example, the time interval between the requests is set to 100 cell times and the input port has 10 cells in its buffer, one cell can be transmitted every tenth cell interval. In this way the size of the output buffers can be reduced. The disadvantage with this technique is, however, that one then postpones the transmission of cells which perhaps quite well could have been sent earlier during the time interval with reference taken to the total traffic intensity. The consequence is a bad degree of exploitation of the switch. Moreover, with burst-like traffic there will be requests for fewer cells than that which the switch core during low traffic can take care of while requests will be refused during high traffic, which contributes to a bad degree of utilization of the switch.

SUMMARY

It must be considered to be a problem to be able to keep a high degree of utilization of the switch in the so-called "Credit based scheme". It must also be considered to be a problem to maintain a high security against "cell loss" without large and expensive output buffers. Another problem is also how to be able to have small output buffers without "shaping".

The invention attempts by means of a method and a device to minimize the output buffers in a switch, to use short time intervals between the requests and still maintain an extremely good degree of utilization by using a form of "over-allocation" and to take into account the degree of fullness of the output buffers when determining how many cells ("credits") can be sent from each input port during the next time interval. This process can from now on be called "giving credit".

An input port here informs each output buffer how many cells it has in its buffer which are addressed to just that output buffer. This is consequently made possible by the input buffer of each input port being divided into a number of FIFO-memories, one for each output port. The input ports will consistently request to be able to send more cells in total than what they would be able to send during the next specific time interval, so-called "over-allocation", in order to in this way increase the degree of utilization of the switch. A request to transmit too many cells (over-allocation) means that the input ports here request to be able to transmit so many cells that, with a switch architecture without output buffers, it would have led to the formation of a queue at the outputs and thereby lost cells if there were no output buffer.

It will be determined how many cells each input can transmit during the next time interval, but in addition to what the inputs have requested to be able to send, the decision is based, according to the invention, also on how many cells there already are in each output buffer. An empty or almost empty output buffer will result in a generous allocation and a nearly full output buffer will result in that nearly no input ports will be allowed to transmit cells. In order to prevent "cell loss" an accurate supervision of the output buffers with a classification into a number of degree of fullness levels is required, preferably with between 3 to 5 different levels, which should be sufficient because there are only short time intervals and therefore a small number of cells to take care of.

According to the inventive concept, extremely short time intervals between the requests should be used, e.g. 3–10 cell times, so that the spreading of the traffic within the time interval will not be too big. This also means that one avoids the use of "shaping", which contributes to a lower degree of utilization of the switch. This together with the above actions means that considerably smaller output buffers can be used. The invention also permits a high degree of utilization of the switch thanks to the use of output buffers.

It also permits a minimization of the size of the output buffers thanks to the short time intervals between each request from the inputs and to reference being taken to the supervision of the degree of fullness of the output buffers.

BRIEF DESCRIPTION OF THE DRAWINGS

Examples of embodiments of the invention will be described below in connection with the accompanying drawings, in which.

DETAILED DESCRIPTION OF EMBODIMENTS

Figure 1:
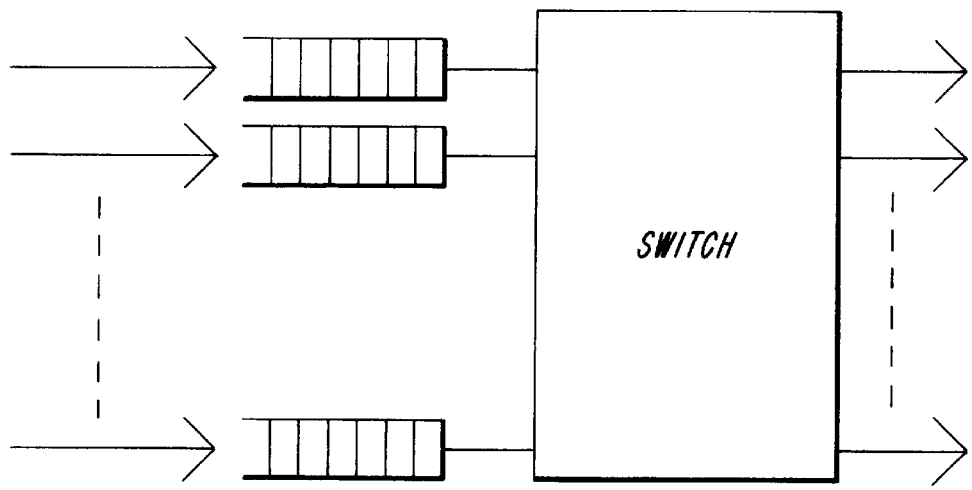
FIG. 1 shows a simple block diagram where cells/packets are buffered before switching, according to the prior art.
Figure 2:
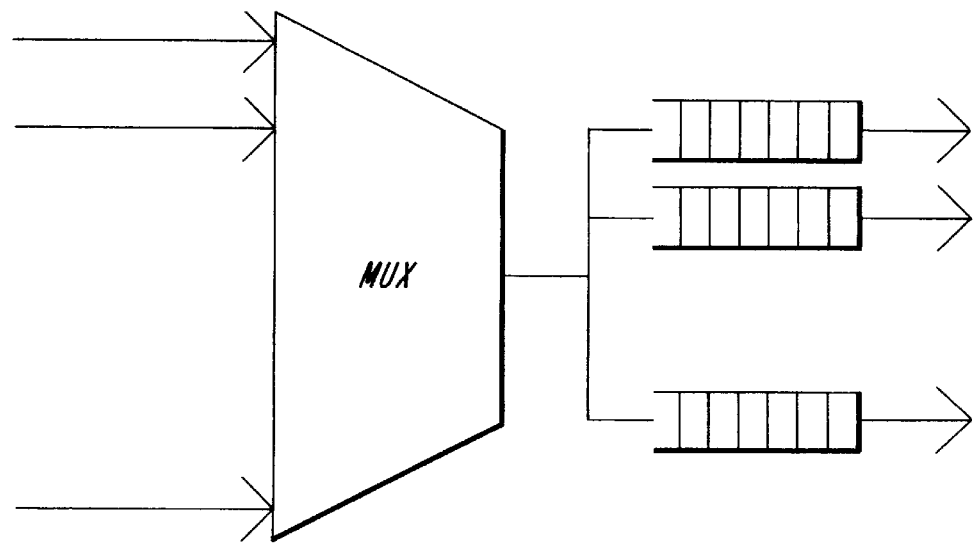
FIG. 2 shows a simple block diagram where cells/packets are buffered after switching, according to the prior art.
Figure 3:
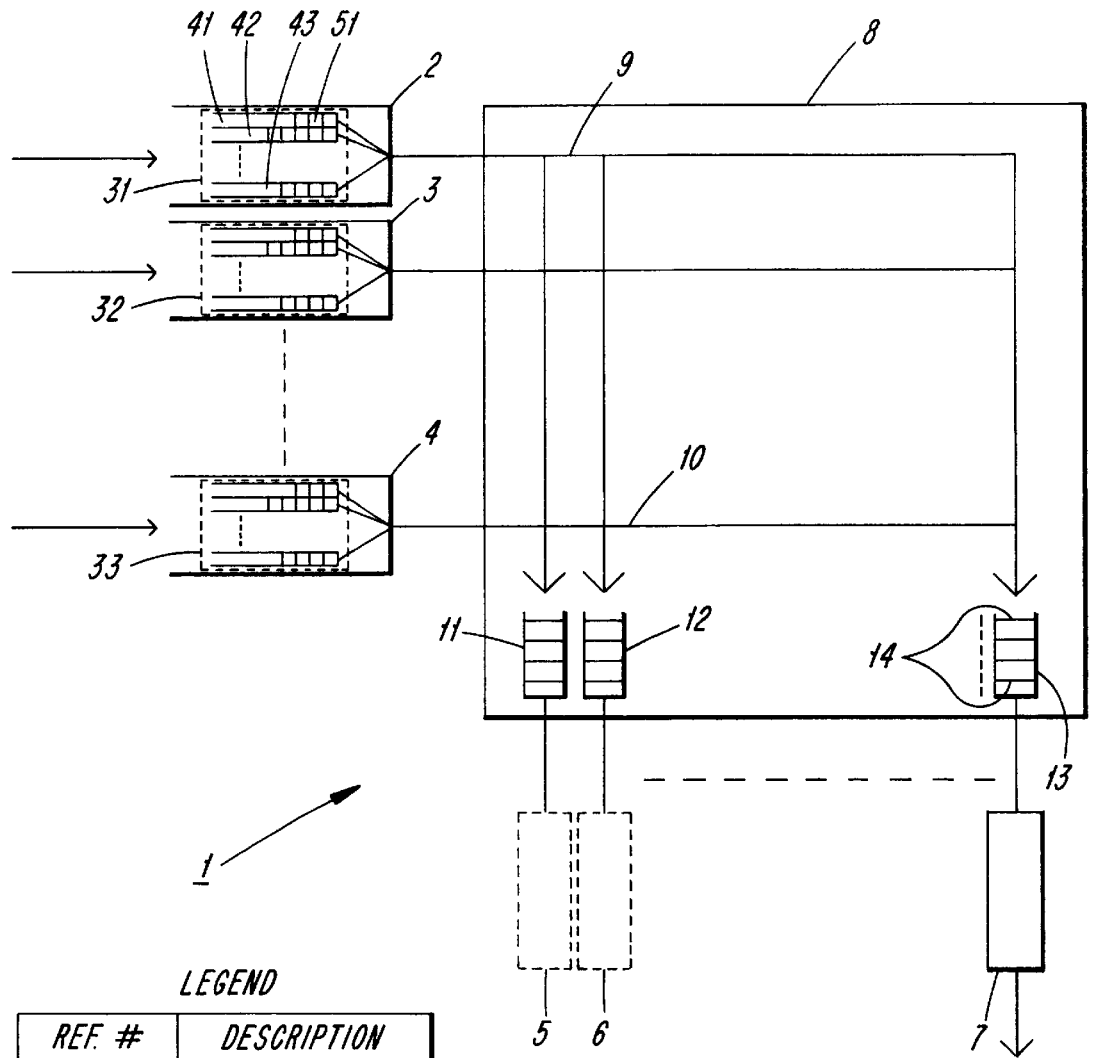
FIG. 3 shows a block diagram with the cell paths according to a preferred embodiment of the invention, comprising buffers both before and after the switch core.

FIG. 1 shows the prior art with the buffers on the input according to a common way of building switches, and FIG. 2 shows another type with buffers on the output. A third type of switch has, according to the prior art, buffers on both the inputs and outputs and it is this type to which the invention is applicable. FIG. 3 shows the invention according to a preferred embodiment. The Figure concentrates on showing the paths for the cells through the switch 1 and, for the sake of simplicity, shows only three input ports 2–4. Furthermore, for the same reason, only three output ports 5–7 are shown. It must, however, be understood that switches of today have an extremely large number of inputs and outputs, respectively.

As FIG. 3 shows, the switch comprises a switch core 8 which in itself comprises a number of connection points (e.g. 9 and 10) in matrix form so that all inputs can reach all outputs. At each output there is an output buffer 11–13 which collects the cells and sends them further to the respective output ports 5–7. In this preferred embodiment the output buffers 11–13 thus are inside the switch core 8. Another alternative is to place them in the output ports 5–7.

Figure 4:
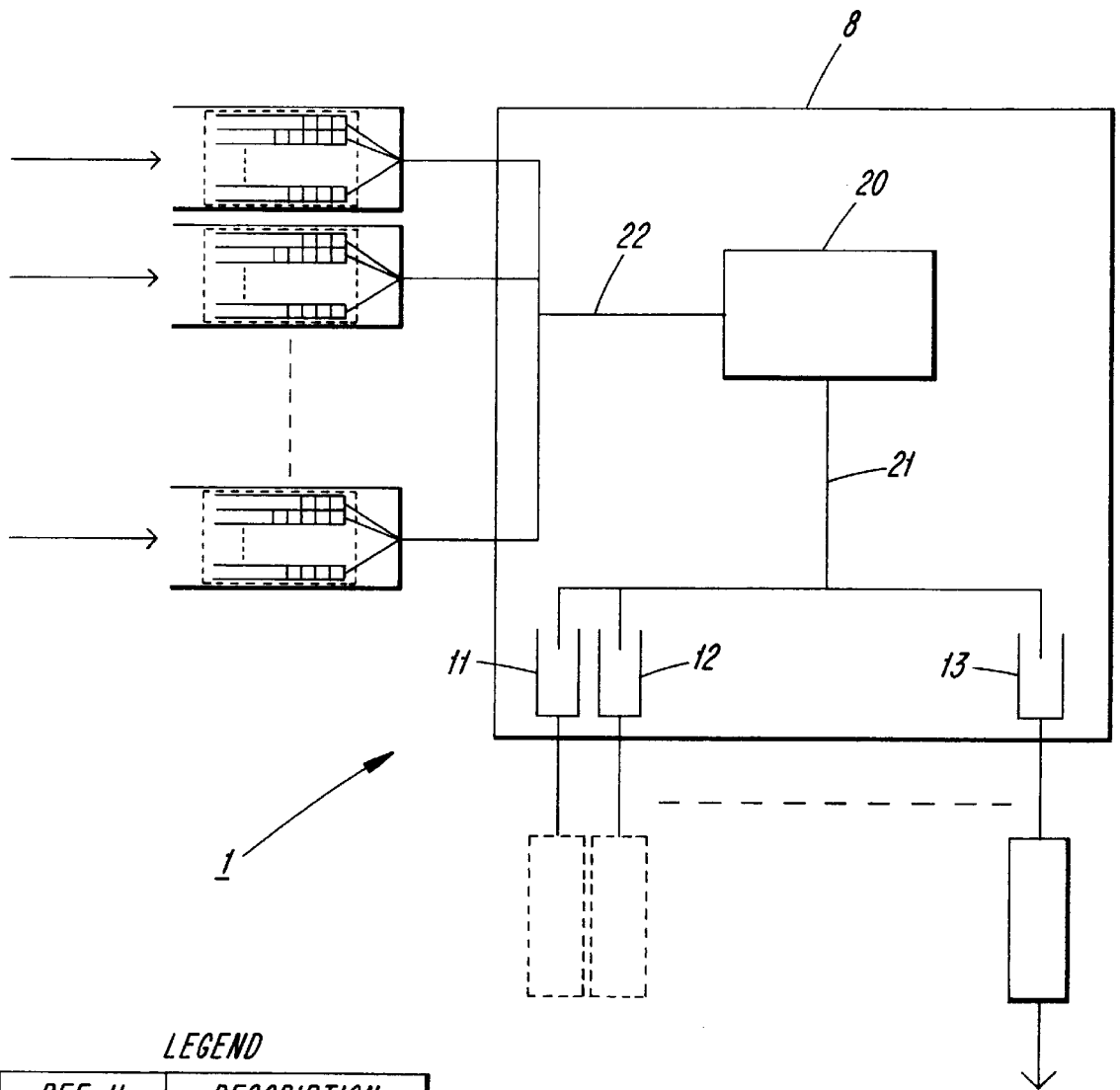
FIG. 4 shows a block diagram with the signal paths according to a preferred embodiment of the invention, comprising buffers both before and after the switch core.

In each input port 2–4 there is a buffer 31–33 which each in turn are divided into a number of FIFO-memories 41–43, into which the cells 51 are sorted depending on which output port 5–7 they are to go to. Thus each input buffer is divided into as many FIFO-memories as there are output ports. This is in order to, with some form of intelligence in the switch, be able to treat the requests from the output ports to transmit cells and to decide which output ports being able to receive cells and, if so, how many and from which FIFO-memories. We can here illustrate the intelligence in the switch by a control unit 20 which is shown in FIG. 4.

The input ports 2–4 inform the control unit 20 of how many cells they have in their input buffers 31–33, and because they are sorted into FIFO-memories, information can be sent about exactly how many cells 51 are intended for the different output ports 5–7. The input ports will totally always request to send more cells than the respective outputs can process without placing any cell in its output buffer 11–13, so-called "over-allocation", naturally with the presumption that the input ports 2–4 have that many cells in their input buffers 31–33.

The request from the input ports to transmit cells takes place at short time intervals, preferably every third, fourth or fifth cell interval, and the control unit reads the requests from the input ports and at the same time performs a supervision of the degree of fullness of the output buffers 11–13. The output buffers are divided into as many filling levels 14 as are required to make possible an accurate reading of its degree of fullness. The control unit 20 takes into account the degree of fullness of the output buffers 11–13 and permits many cells to be sent in the next time interval if the buffer is empty or almost empty at the same time as it may permit very few or no cells to pass the switch core 8 if the buffer is full or nearly full.

The fact that the intelligence in the switch has been illustrated by a control unit 20 situated in the switch core 8 should not be seen as a limitation to this hardware construction but only as a simple way of showing a preferred embodiment. Other solutions are also conceivable, for example, the control unit could equally well be outside the switch core 8, or one could also conceive a solution without a separate control unit where the input ports would be able to read the degree of fullness of the output buffers, and with these facts together with the information sent from the input ports with request to send a certain number of cells, easily calculate how many cells can be permitted to be sent in the next time interval. FIG. 4 consequently illustrates, according to the preferred embodiment, the signal paths necessary for realizing the invention. We assume that the control unit 20 is inside the switch core 8 and via the connection 22 receives information from the different input ports 2–4 on how many cells they are requesting to send from their FIFO-memories to the respective output port. The information is put together in the the control unit and the load for each output port is calculated. Via the connection 21 the control unit gets to know the degree of fullness of each output buffer 11–13 and can then easily calculate how many cells can be sent to the respective output buffer and through some conceivable form of priority classification also which input ports should be allowed to sent their cells if several are competing for this. The information about the transmission permission is then sent via the connection 22 to the input ports concerned, and then the cells are transmitted through the switch core 8 to the respective output buffers 11–13.

It is also conceivable that the decision on how many cells should be sent during the next time interval also is based on how many cells actually have been granted transmission permission during the current time interval.

In FIGS. 3 and 4 we can see the output buffers 11–13 implemented inside the switch core 8. It is also conceivable to implement them in the output ports 5–7.

What is claimed is:

1. Method for switching of data packets/cells in a data/telecommunication system comprising the steps of:
    controlling the flow of outer packets/cells through at least one switch:
        connecting input ports to the inputs of a switch core,
        connecting output ports to the outputs of the switch core,
        placing at least one input buffer in connection to each input port and dividing said input buffer into a number of FIFO-memories, one for each output port,
        letting the input ports make requests, during a certain time interval, to be allowed to send cells from their FIFO-memories through the switch core, wherein:
        said requests are repeated at very short time intervals,
        the requests over-allocate the outputs from the switch core, and
        output buffers are placed in connection to the output ports.

2. Method for switching of data packets/cells in a data/telecommunication system according to claim 1, wherein the requests occur at intervals of 3–5 cell intervals.

3. Method for switching of data packets/cells in a data/telecommunication system according to claim 1, wherein the number of cells which the input ports in their requests request to be allowed to transmit from their FIFO-memories are based both on how many cells there are in the FIFO-memories of the input ports and how many cells there are in the output buffer which is addressed by the respective FIFO-memories of the input ports.

4. Method for switching data packets/cells in a data/telecommunication system according to claim 3, wherein the number of cells which the input ports in their requests request to be allowed to transmit from their FIFO-memories during a next time interval is also based on how many cells actually received transmission permission during a current time interval.

5. Method for switching of data packets/cells in a data/telecommunication system comprising the steps of:
    controlling the flow of data packets/cells through at least one switch,
        connecting input ports at the inputs to a switch core,
        connecting output ports at the outputs of the switch core,
        placing at least one input buffer in connection to each input port and dividing said input buffer into a plurality of FIFO-memories, one for each output port,
        letting the input ports make a request to be allowed to send cells from their FIFO-memories through the switch core, wherein the output buffers are placed in connection to the output ports and that a decision on how many cells should be allowed to be sent from each FIFO-memory is based both on how many cells there are in each FIFO-memory of the input ports and on how many cells there are in the output buffers which is addressed by the respective FIFO-memories of the input ports.

6. Method for switching of data packets/cells in a data/telecommunication system according to claim 5, wherein the output buffers and the input ports are supervised by a control unit which determines how many cells are to be sent from each FIFO-memory.

7. Method for switching of data packets/cells in a data/telecommunication system according to claim 6, wherein the degree of fullness of the output buffers is read in a number of filling levels, preferably 3–5.

8. Method for switching of data packets/cells in a data/telecommunication system according to claim 1, wherein an ATM-switch is used as the switch.

9. Device for switching of data packets/cells in a data/telecommunication system comprising at least one switch which at least comprises:
    a switch core,
    an input port at each input to the switch core, arranged to send a request to be allowed, during a certain time interval, to send cells through the switch core,
    an output port at each output from the switch core,
    an input buffer in connection to each input port, where each input buffer is divided into a plurality of FIFO-memories, one for each output port, wherein:
        there is a very short time interval between each request,
        the input ports are arranged to over-allocate the output ports from the switch core with their requests, and
        output buffers are placed in connection to the outputs.

10. Device for switching of data packets/cells in a data/telecommunication system according to claim 9, wherein a time interval between the requests is 3–5 cell intervals.

11. Device for switching of data packets/cells in a data/telecommunication system according to claim 10, wherein the output buffers are divided into a number of filling levels, preferably 3–5.

12. Device for switching of data packets/cells in a data/telecommunication system according to any of claim 9, wherein a control unit is arranged to supervise the requests from the input ports and the degree of fullness of the output buffers and to calculate how many cells should be given permission to be sent from each FIFO-memory to each output port during a next time interval.

13. Device for switching of data packets/cells in a data/telecommunication system according to any of claim 9, wherein the switch is an ATM-switch.

14. Method for managing cells of data through a switching network, comprising the steps of:

dividing an input buffer, that is connected to an input port, into a number of FIFO-memories;

informing an output buffer of how many cells, that are addressed to the output buffer, the input buffer contains;

requesting, by the input buffer, to send cells to the output buffer;

sending cells, through a switch core, to the output buffer based upon a response to the request.

15. The method of claim 14, wherein the response to the request is determined by the degree of fullness of the output buffers.

16. The method of claim 15, wherein the degree of fullness is measured in levels of 3 to 5.

17. The method of claim 14, wherein short time intervals of 3 to 10 cell times are used between each request.

18. The method of claim 14, wherein the switch network is an Asynchronous Transfer Mode network.

19. A monitoring device for monitoring cells of data through a switch network, comprising:

a switch core;

an input buffer connected to an input port;

an output buffer connected to an output port;

wherein the input buffer sends requests to the output buffer to send cells to the output buffer; and wherein a response is sent back to the input buffer informing the input buffer on how many cells it can send through the switch core to the output buffer.

20. The device of claim 19, wherein the response is based upon the degree of fullness of the output buffer.

21. The device of claim 20, wherein the degree of fullness is measured in levels of 3 to 5.

22. The method of claim 19, wherein short time intervals of 3 to 10 cell times are used between each request.

23. The method of claim 19, wherein the switch network is an Asynchronous Transfer Mode network.

* * * * *